US006609318B2

(12) United States Patent
Augustine et al.

(10) Patent No.: US 6,609,318 B2
(45) Date of Patent: Aug. 26, 2003

(54) DISPLAY DEVICE

(76) Inventors: Gene Anthony Augustine, 654 Austin, Coquitlam (CA), V3K 3N1; William Kochan, 1319 East 62nd Avenue, Vancouver (CA), V5X 2H4; Ray Wayne Augustine, 1810 Harbour Drive, Coquitlam (CA), V3K 5W7

(*) Notice: Subject to any disclaimer, the term of this patent is extended or adjusted under 35 U.S.C. 154(b) by 0 days.

(21) Appl. No.: 09/862,142

(22) Filed: May 22, 2001

(65) Prior Publication Data

US 2002/0056214 A1 May 16, 2002

(30) Foreign Application Priority Data

Nov. 16, 2000 (CA) ............................................ 2326042

(51) Int. Cl.[7] .......................... G09F 11/18; G09F 11/02; G09F 11/00; B25G 3/18; F16B 21/00

(52) U.S. Cl. ............................ 40/518; 40/499; 40/904; 403/321

(58) Field of Search .......................... 40/518, 493, 494, 40/499, 503, 506, 529, 603, 604, 904; D08/303; 403/321, 322.2, 347, 375, 381

(56) References Cited

U.S. PATENT DOCUMENTS

| | | | | | |
|---|---|---|---|---|---|
| ,159,058 | A | * | 1/1875 | Adams | 40/518 |
| 1,461,842 | A | * | 7/1923 | Westman | 40/518 |
| 1,711,850 | A | * | 5/1929 | Lake | 40/518 |
| 2,163,523 | A | * | 6/1939 | Whitmyre | 40/518 |
| 2,783,564 | A | | 3/1957 | Steeland | |
| 3,174,241 | A | | 3/1965 | Rohan | |
| 3,263,354 | A | | 8/1966 | Andrews | |
| 3,408,757 | A | * | 11/1968 | McQuistion | 40/518 |
| 4,041,626 | A | * | 8/1977 | Ellis et al. | 40/518 |
| 4,041,627 | A | | 8/1977 | Lyman | |
| 4,083,136 | A | * | 4/1978 | Zelenko | 40/518 |
| 4,524,993 | A | | 6/1985 | Walker-Taylor | |
| 4,646,453 | A | * | 3/1987 | Reinhart | 40/117 |
| 5,329,711 | A | | 7/1994 | Dewey | |
| 5,605,001 | A | * | 2/1997 | Derk | 40/518 |
| 5,924,869 | A | * | 7/1999 | Haas | 40/518 |
| 6,000,986 | A | | 12/1999 | Kaufman | |

OTHER PUBLICATIONS

US 2001/0010133 A1, Schoening, Aug. 2, 2001, entire document.*

* cited by examiner

*Primary Examiner*—S. Joseph Morano
*Assistant Examiner*—Jason R. Bellinger
(74) *Attorney, Agent, or Firm*—Frederick Kaufman

(57) ABSTRACT

The display device, according to the present invention, is adaptable to use a cartridge of flexible material terminating at each end in a tubular element. The display device comprises a pair of spool-rod means, each one of the pair of spool-rod means including rod means, first handle means axially connected at one end of the rod means, and second handle means outwardly extending at the other end of the rod means. The rod and first handle means are provided with attaching means for detachably connecting the rod and first handle means. The display device exposes text and/or images to be viewed as consecutive incremental portions of the flexible material, which is adapted to be rolled or unrolled.

9 Claims, 7 Drawing Sheets

DISPLAY DEVICE

BACKGROUND OF THE INVENTION

1. Field of the Invention

The present invention relates to a display device particularly adapted to use a cartridge of continuous, flexible material.

2. Description of the Prior Art

Conventional books are made to enable the simultaneous viewing of a pair of adjacent pages and viewing any subsequent or preceding page usually requires the flipping of the pages of the book. Frequently, pages are stuck together and separating them constitutes a nuisance. Attempts have been made in the past to address the mentioned problem. The following disclosures relate to various types of reading and display devices: Kaufman (U.S. Pat. No. 6,000,986, issued Dec. 14, 1999); Dewey (U.S. Pat. No. 5,329,711, issued Jul. 19, 1994); Walker-Taylor (U.S. Pat. No. 4,524,993, issued Jun. 25, 1985); Lyman (U.S. Pat. No. 4,041,627, issued Aug. 16, 1977); Andrews (U.S. Pat. No. 3,263,354, issued Aug. 2, 1966); Rohan (U.S. Pat. No. 3,174,241, issued March. 23, 1965); and Steenland (U.S. Pat. No. 2,783,564, issued Mar. 5, 1957). The inventors believe that the cited disclosures taken alone or in combination neither anticipate nor render obvious the present invention. The foregoing citation does not constitute an admission that such disclosures are relevant or material to the claimed subject matter. Rather, the disclosures relate only to the general field of the invention and are cited as constituting the closest art of which the inventor is aware.

SUMMARY OF THE INVENTION

An objective of the invention is to provide a display device having sufficient space to expose text and/or images to be viewed as consecutive incremental portions of a ribbon adapted to be rolled or unrolled.

In general, the display device, according to the present invention, is adapted to use a cartridge of continuous flexible material terminating at each end in a tubular element, and comprises a pair of spool-rod means. Each spool-rod means includes rod means, first handle means axially engaged to one end of the rod means, and the second handle means outwardly extending at the other end of the rod means. The rod and first handle means are provided with attaching means for detachably connecting together the rod and first handle means. The rod means comprises a rod having a cross section with at least two contact surfaces extending along the whole length of the peripheral surface of the rod. The two contact surfaces are adapted to match and loosely engage the interior of the tubular element, while not allowing a relative rotational movement between the rod and first handle means.

In one aspect of this invention the rod means includes a rod having a square cross section and an end for insertion into the first handle means. This end terminates in a split segment having two legs, one of which being provided at its external end with a rounded cog extending outwardly. The first handle means has a longitudinal hole with a cross section commensurate, for a close running fit, with the rod means. Towards at least one end of the longitudinal hole, around its perimeter, a transversal notch is provided.

In another aspect of the invention a guard-disk is assembled with the rod means, proximate to one of the first and second handle means. A double guard-disk is also assembled with the rod means, at an opposite, which is proximate to one of the first and second handle means. When a pair of spool-rods is brought together, the guard and double-guard disks, which are adjacent to each other at both extremities of the rod means, interpenetrate.

In yet another aspect of this invention, a cylindrical peg extends outwardly from one of the first and second handle means and a palm roller is loosely assembled with the cylindrical peg. Means for keeping the palm roller on the cylindrical peg, while permitting a free rotation of the palm roller on the cylindrical peg, is used.

In another aspect of this invention an extension rod is used. Each of the first and second handle means are provided with a longitudinal hole open toward the outside ends of the first and second handle means. The longitudinal hole has a cross section commensurate, for a close-running fit, with the cross section of the extension rod. Both cross sections have at least two contact surfaces. A base roller means is loosely attached for rotation around an outside end of the extension rod. Thus, the spool-rod can be rotated.

In another aspect of the invention a cylindrical dowel extends inwardly from each of the handle means. A rolling collar is loosely mounted, for easy rotation, on each cylindrical dowel, and is provided with equally spaced and radially drilled blind holes. At least one separator has one end inserted into a blind hole of one of the rolling rollers, while the opposite end is inserted into another blind hole of a transversally opposite rolling collar.

Thus, at least one separator is adapted to keep the pair of spool-rods apart.

In another aspect of this invention cylindrical dowels and rolling collars, identical with those described above, are used. A frame means, having a pair of long sides, is also used. In each long side a pair of blind openings is provided. Each pair of blind openings in one long side is the mirror image of the opposite one. The blind holes are compatible with the blind openings. Two pairs of vertical bars are used to support a pair of spool-rods on the frame means. Each vertical bar has its upper end inserted into a blind hole, while its lower end is inserted into an opposite blind opening.

In another aspect of the invention, use is made of a crank insertable in the outside end of each end of the first and second handle means.

In a last aspect of this invention, carrier means is used. The carrier means comprises a handgrip having at both extremities downwardly extending split sections, each of which includes two arms. One of the arms has, at its end, a rounded tooth extending outwardly. When the split sections are inserted into or withdrawn from longitudinal holes in the handles, the teeth snap into or out of transversal notches provided in the longitudinal holes.

BRIEF DESCRIPTION OF THE DRAWINGS

Although the characteristic features of the invention will be particularly pointed out in the claims, the invention itself and the manner in which it may be made and used, may be better understood by referring to the following description and accompanying drawings. Like reference numerals refer to like parts throughout the several views of the drawings in which:

DESCRIPTION OF THE PROFFERED EMBODIMENT

Figure 1:
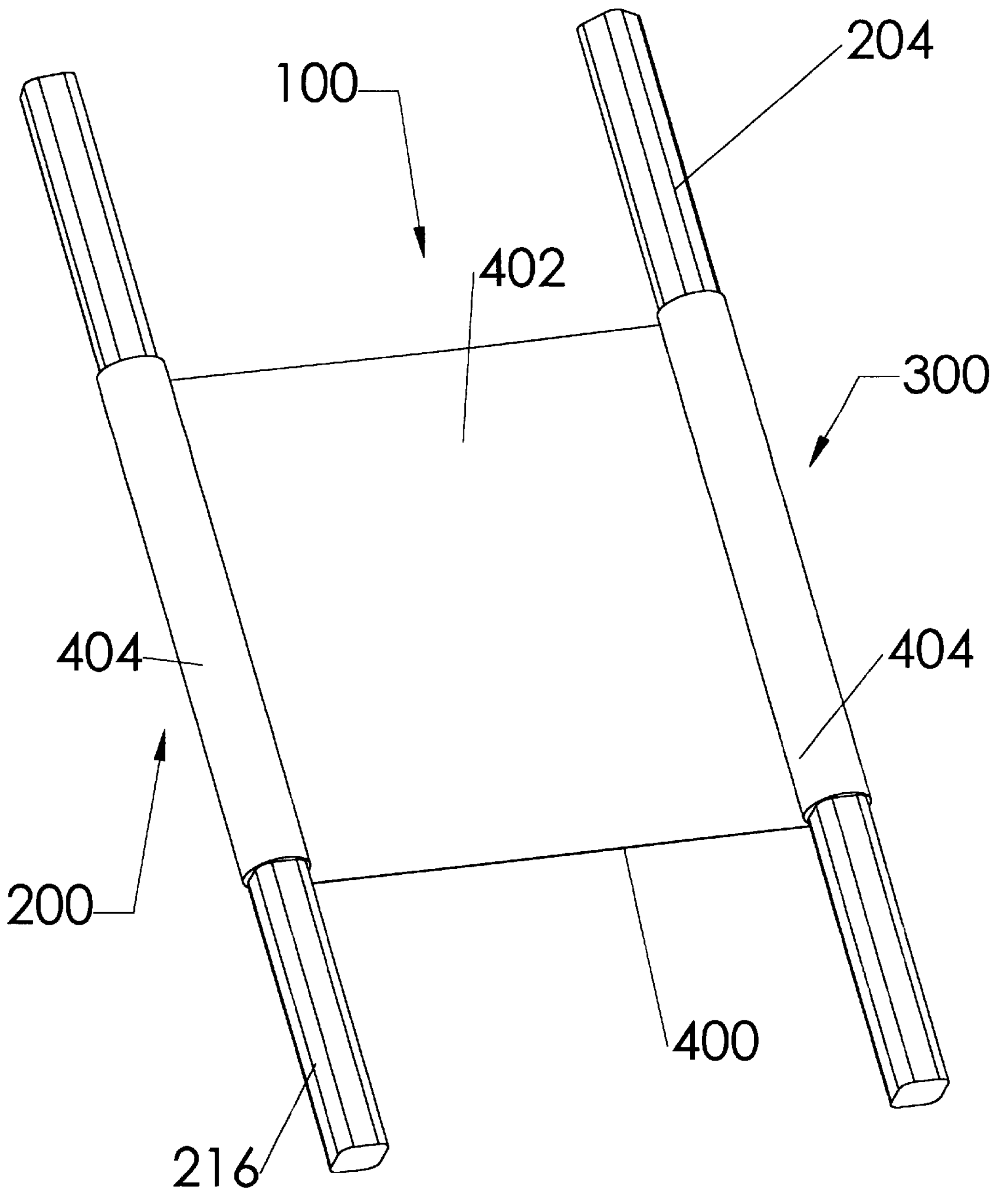
FIG. 1 illustrates the basic embodiment of the display device.
Figure 2:
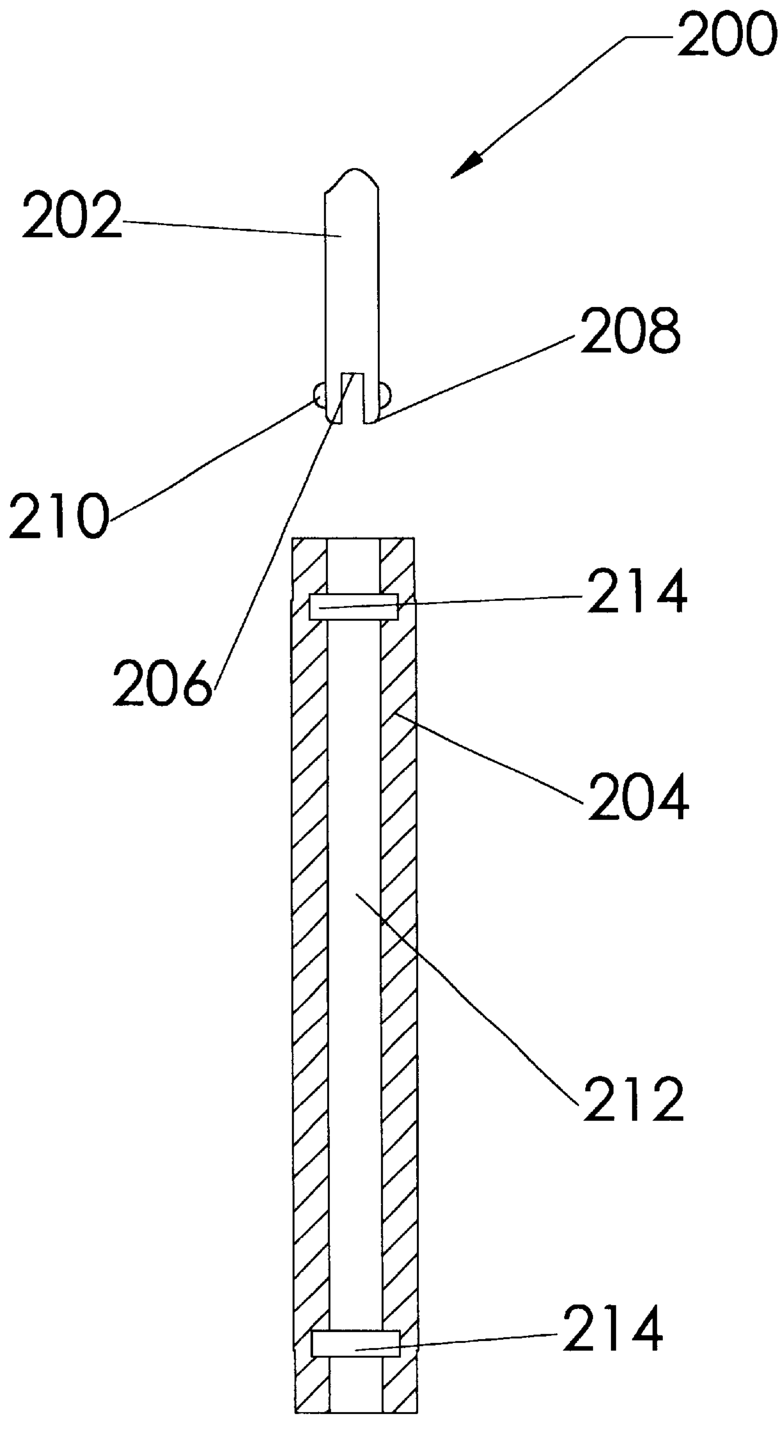
FIG. 2 illustrates a rod and a handle for axial engagement.

Turning to FIG. 1, the display device 100 according to the present invention comprises a first and second spool-rods 200 and 300 respectively, which are adapted to be rotated and held substantially apart and parallel to each other. A cartridge 400 including a continuous ribbon 402 of flexible material terminates, at its ends, in a tubular element 404. By intermittently and simultaneously rotating both first and second spool-rods 200 and 300 about their longitudinal axes, a sequence of texts and/or images are exposed to the eye of the viewer. Now referring to FIG. 2, in its simplest form, first spool-rod 200, comprises a rod 202 of square cross section to which, at one end, a first handle 204, axially engaged on it, is detachably joined. To this 202 terminates, adjacent to first handle 204, in a split segment 206 having two legs 208. At the end of one leg 208, a rounded cog 210 extends outwardly. First handle 204 has a square cross section and is provided with a longitudinal hole 212 having a cross section commensurate for a close-running fit with rod 202. Towards each end of longitudinal hole 212, around its perimeter, a transversal notch 214 is provided. By sliding rod 202 in longitudinal hole 212, rounded cog 210 penetrates into the proximate transversal notch 214. Thus, first handle 204 can be snapped onto and off of rod 202. The use of the other transversal notch 214 will be described later in the disclosure.

Alternatively, a spring actuated clamp (not shown), of conventional type, is attached to first handle 204 and is provided with a pin which passes through the latter and penetrates in a groove provided in rod 202.

A second handle 216 is firmly attached to the other end of rod 202. It is also possible that a second handle 216 is integrally formed as a unit with rod 202.

Figure 3:
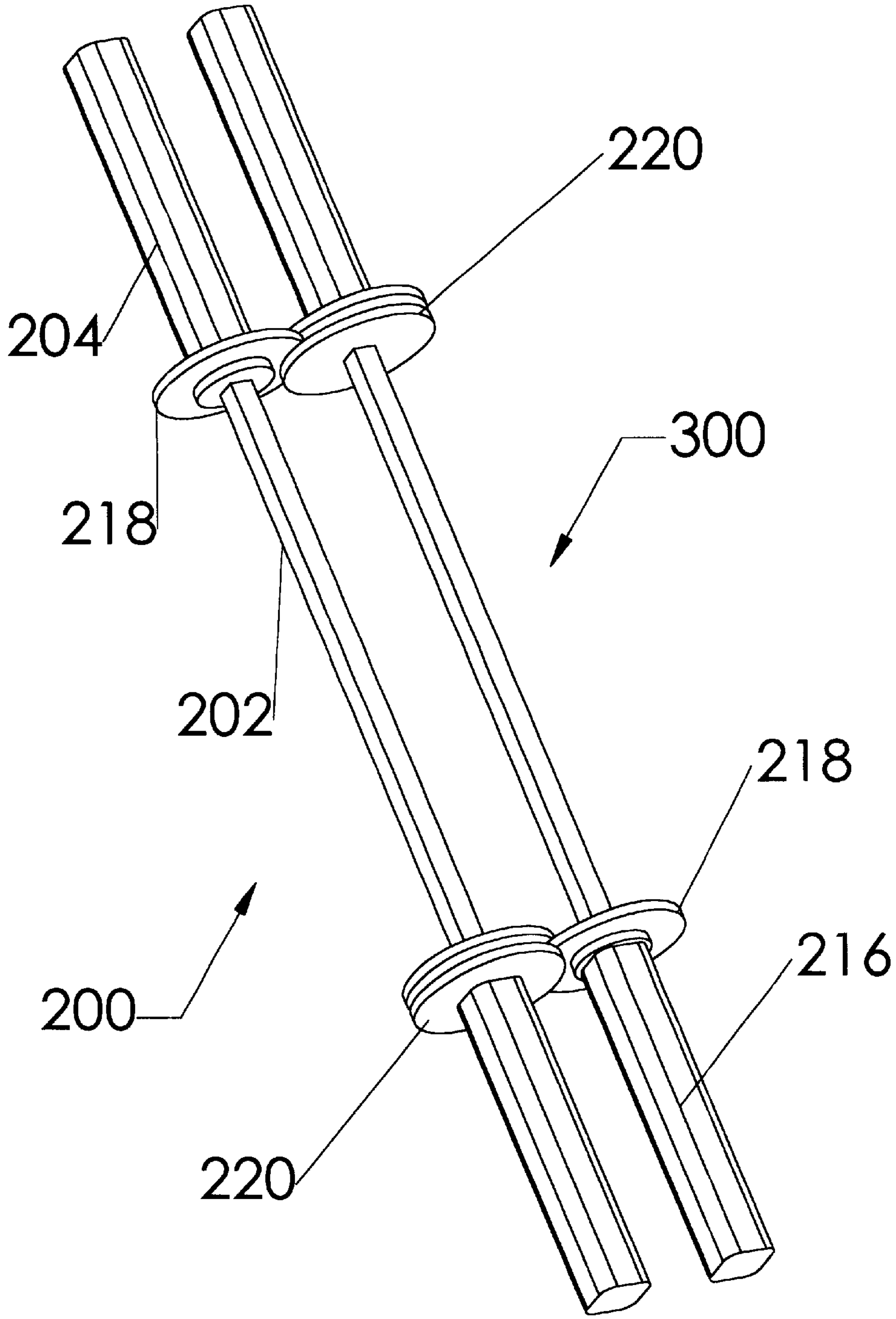
FIG. 3 illustrates the spool-rods provided with guard-disks.

In FIG. 3 first spool-rod 200 is also provided on rod 202, near first handle 204, with a guard-disk 218 assembled with rod 202. A double guard-disk 220 is also assembled with rod 202, near second handle 216. Second spool-rod 300 is identical and complementary to first spool-rod 200. The complementarity resides in the fact that the positions of guard disk 218 and double guard-disk 220 are mutually switched with respect to those of first spool-rod 200. When display device 100 is not in use, first and second spool-rods 200 and 300 are brought together, so that guard-disk 218 interpenetrates with double guard-disk 220.

Figure 4:
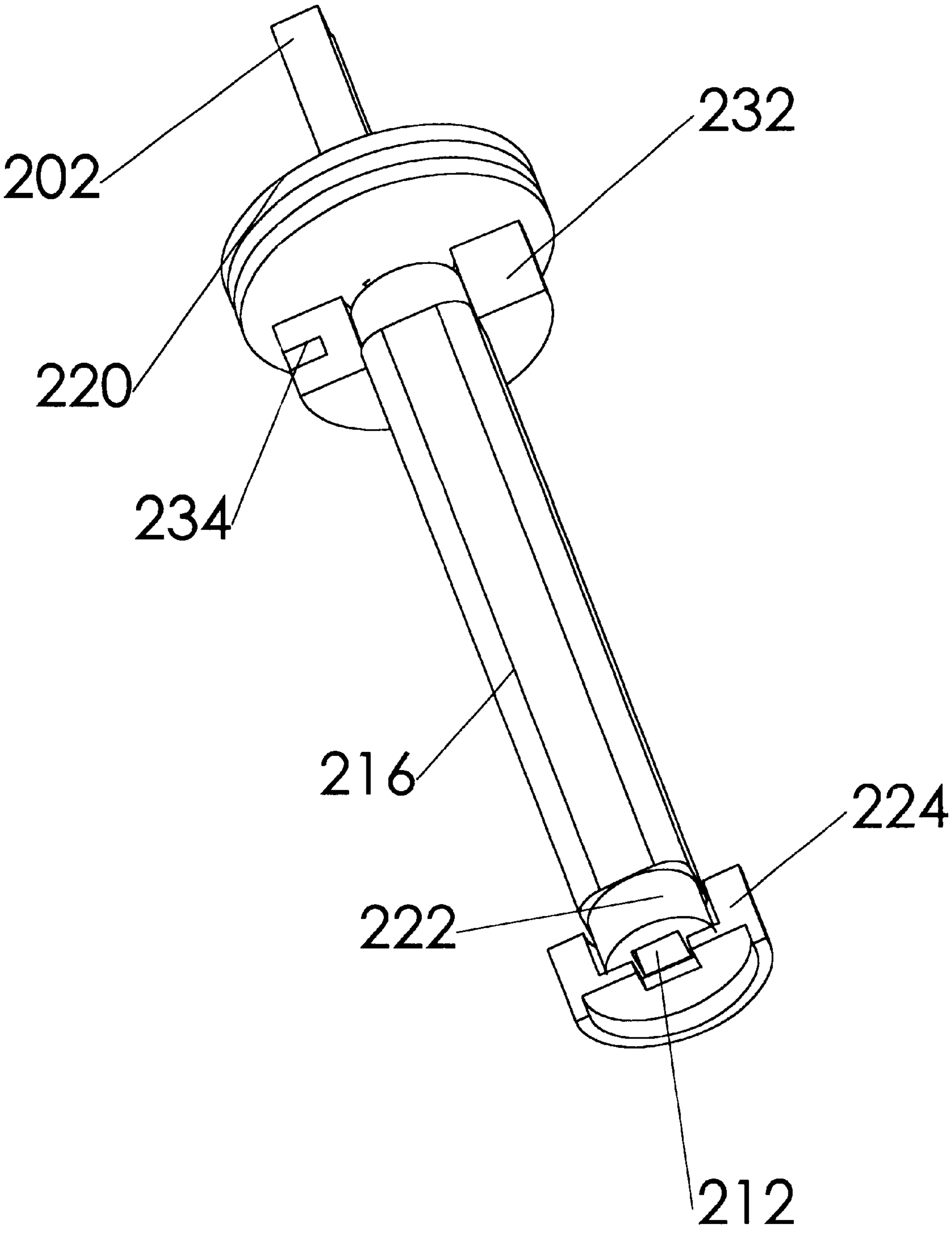
FIG. 4 illustrates a handle provided with a palm roller.

In one form of the invention shown in FIG. 4, each second handle 216 is provided with a cylindrical peg 222 extending outwardly from it. Longitudinal hole 212, which is provided in the above mentioned handles, extends throughout cylindrical peg 222. A palm roller 224 is loosely assembled with each cylindrical peg 222, so second handles 216 together with their rods 202 can be easily rotated with fingers and thumb. During this time, palm rollers 224 are immobilized in the palms of the user.

Figure 5:
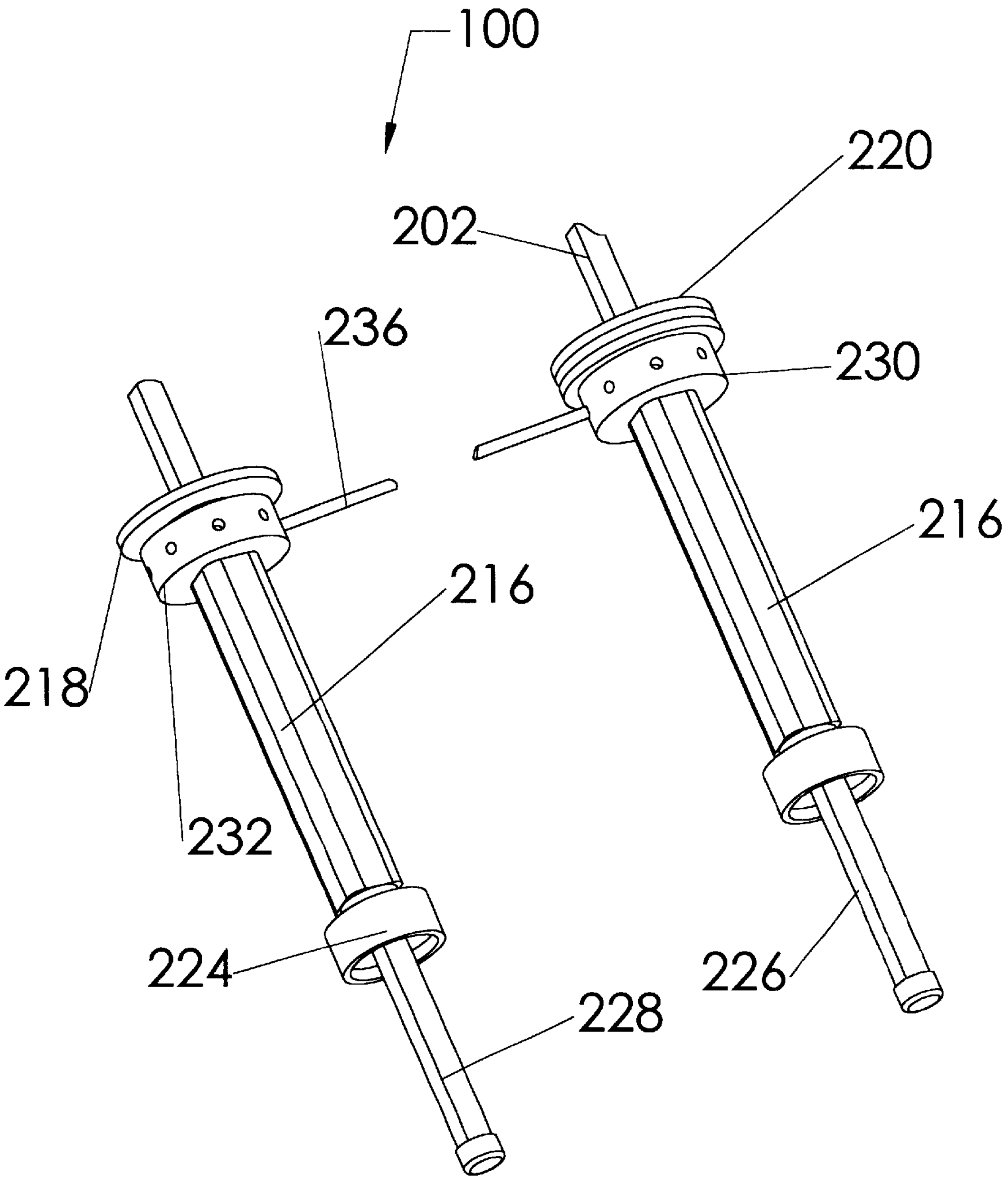
FIG. 5 illustrates handles provided with extension rods.

Conventional means are used for keeping each palm roller 224 on its cylindrical peg 222, while permitting free rotation of the palm roller 224 on the cylindrical peg 222. Another form of the invention is shown in FIG. 5. In the previous examples, during the use, display device 100 is kept in the hands of the reader. In the following example the reader's lap or other available support could serve as a base. To this end, into each second handle 216 an extension rod 226 is inserted. Extension rod 226 has a square cross section commensurate for a close-running fit with the size of longitudinal hole 212 in second handles 216. To the out side end of each extension rod 226, a base roller 228, similar to palm roller 224 but of lesser size, is attached. Extension rod 226 is rotated together with second handle 216.

Each first and second handle, 204 and 216 respectively, terminates inwardly, behind each guard-disk 218 and double guard-disk 220, in a cylindrical dowel 230 (FIG. 4). A rolling collar 232 is loosely mounted on each cylindrical dowel 230 and is provided with equally spaced and radially drilled blind holes 234. Each rolling collar 232 has a limited axial movement between a shoulder formed by each cylindrical dowel 230 and the adjacent part of first or second handle 204 or 216, at one side, and adjacent guard-disk 218 or double guard-disk 220, at the other side.

A pair of separators 236, in FIG. 5 only one separator is shown, is used to keep first and second spool-rods 200 and 300 apart at a distance equal to a page of text or images. Each end of a separator 236 is inserted into a blind hole 234 of transversally opposite rolling collars 232.

Figure 6:
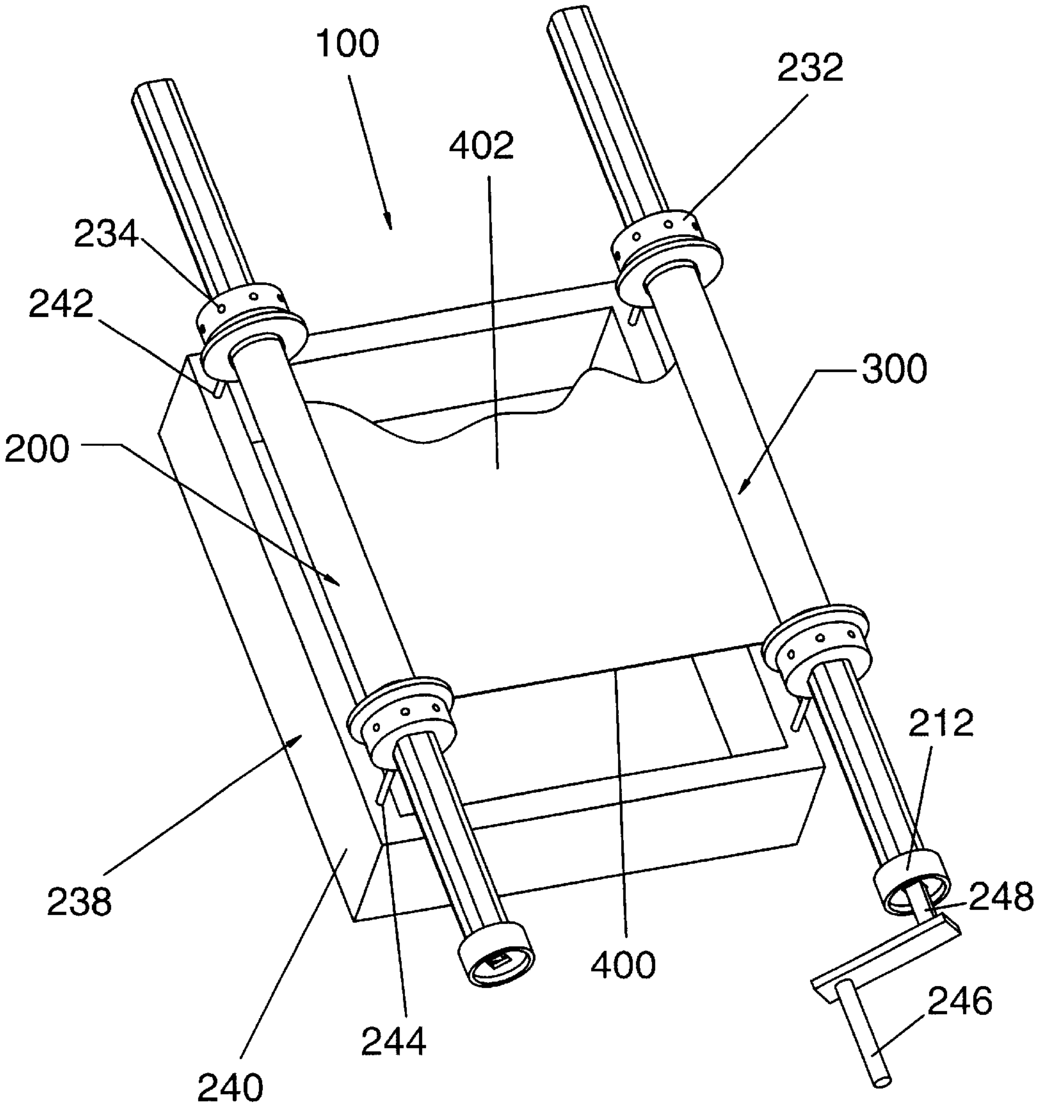
FIG. 6 illustrates the display device supported by a rectangular frame.

In another example of the invention, see FIG. 6, in lieu of keeping display device 100 in reader's hands or on reader's lap, a rectangular frame 238 is supported on a desk. Rectangular frame 238 comprises a pair of long sides 240. In each long side 240, at least a pair of blind openings 242 is provided. Each pair represents the mirror image of the opposite one. Blind openings 242 and blind holes 234 are completely compatible. Two pairs of vertical bars 244 are used to support first and second spool-rods 200 and 300 on rectangular frame 238. Each vertical bar 244 has the upper end inserted into a blind hole 234, while the lower end is inserted in a blind opening 242. In order to facilitate the advancement of continuous ribbon 402, a crank 246 is employed. Crank 246 includes a shaft 248. By inserting shaft 248 in longitudinal hole 212, which commences with cylindrical peg 222 and extends into an adjacent handle, and by turning crank 246, the corresponding spool-rod is rotated.

Figure 7:
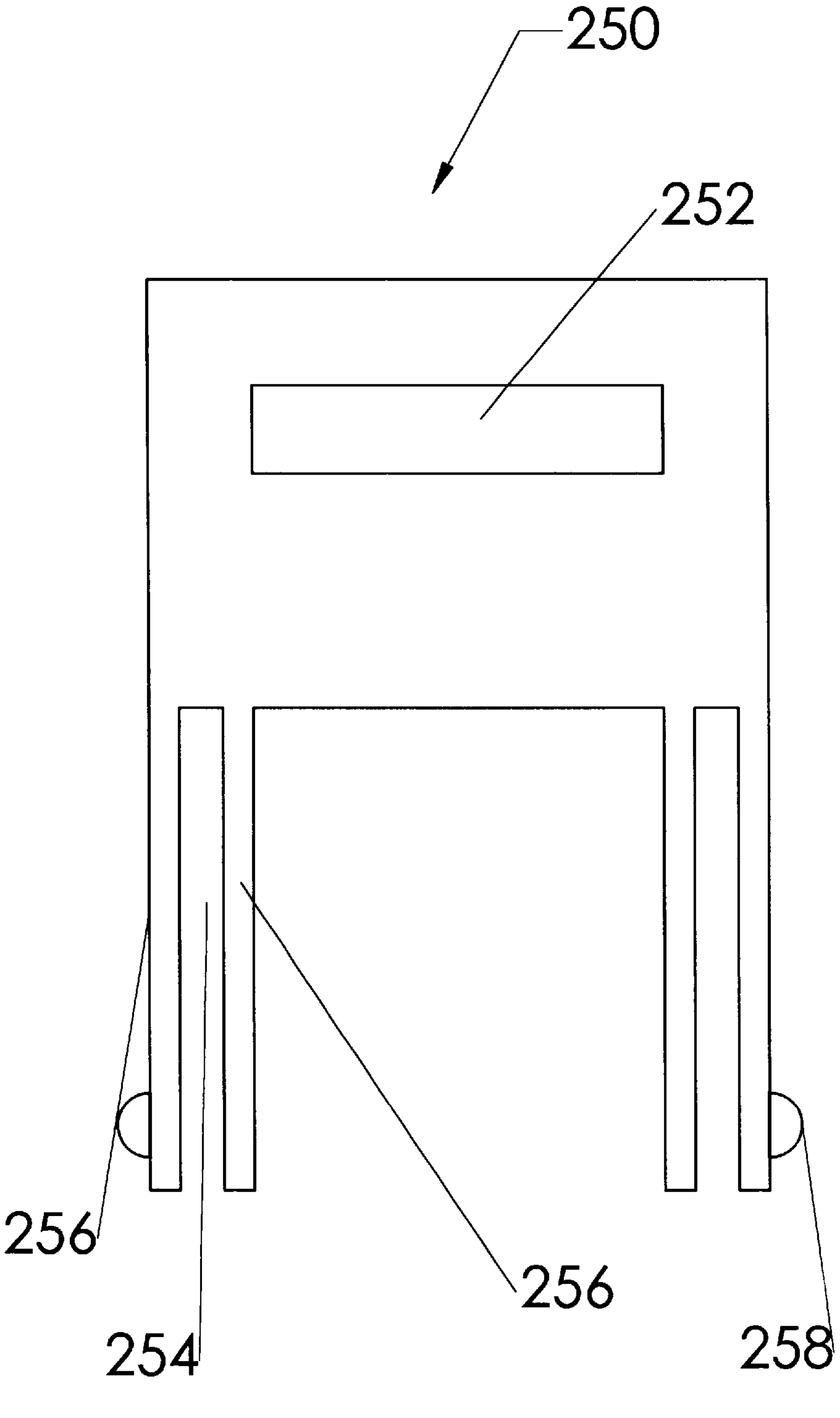
FIG. 7 illustrates a carrier for the spool-rods.

A carrier 250, see FIG. 7, comprising a handgrip 252 having at both extremities downwardly extending split sections 254, is used to hold and carry first and second spool-rods 200 and 300. Each split section 254 includes two arms 256. At the end of one of the two arms 256, a rounded tooth 258 extends outwardly. Split sections 254 are similar to split segment 206. When split sections 254 are inserted into or withdrawn from longitudinal holes 212, teeth 258 snap into or out of corresponding transversal notches 214.

Referring now back to cartridge 400, the interior cross section of tubular elements 404 is compatible with the square cross section of rod 202. Thus, when a rod 202 is actuated, it will engage and rotate mated tubular element 404. Alternatively, in relation to the square cross section used in the above embodiments, other forms of cross sections which prevent a relative movement between contact surfaces of rod 202 and tubular element 404 can be used.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as representative basis for teaching one skilled in the art to variously employ the present invention in virtually any appropriately detailed structure.

The embodiments of the invention in which an exclusive property or privilege is claimed are defined as follows:

1. Display device, adaptable to use a cartridge of continuous flexible material terminating at each end in a tubular element, which comprises a pair of spool-rod means, each of which including rod means;

first handle means axially engaged to said rod means, at one end of said rod means;

second handle means outwardly extending at the other end of said rod means; said rod means and said first handle means being provided with attaching means for detachably connecting together said rod means and first handle means; whereby said rod means comprises a rod having at least two contact surfaces extending along the whole length of the peripheral surface of said rod, said at least two contact surfaces being adapted to match and loosely engage the interior of said tubular element, while not allowing a relative rotational movement between said rod and first handle means.

2. Spool-rod for a display device comprising, in combination, rod means;

first handle means axially engaged at one end to said rod means;

second handle means disposed at the other end of said rod means, said rod means including a rod having a square cross section and an end for insertion into said first handle means, said end for insertion terminating in a split segment having two legs, one of which terminates at its external end with a rounded cog extending outwardly, while said first handle means has a longitudinal hole with a cross section commensurate for a close running fit with said rod; and towards at least one end of said longitudinal hole, around its perimeter, a transversal notch is provided.

3. Spool-rod for a display device, comprising, in combination, rod means;

first handle means attached to one end of said rod means;

second handle means disposed at the other end of said rod means; said rod means and one of said first and second handle means being provided with attaching means for detachably connecting said rod means with one of said first and second handle means;

a guard-disk means for interpenetrating assembled with said rod means, at one end of said rod means, proximate to one of said first and second handle means; and a double guard-disk means for inter penetrating assembled with said rod means, at the opposite end, which is proximate to one of the first and second handle means; whereby when a pair of spool-rods are brought together, said guard and double guard-disks means for interpenetrating, which are adjacent to each other at both extremities of said rod means, interpenetrate.

4. Spool-rod for a display device comprising, in combination rod means;

first handle means disposed at one end of said rod means;

second handle means disposed at the opposite end of said rod means; said rod means and one of said first and second handle means being provided with attaching means for detachably connecting said rod means and one of said first and second handle means;

a cylindrical peg extending outwardly from one of said first and second handle means;

a palm roller loosely assembled with said cylindrical peg; and means for keeping said palm roller on said cylindrical peg while permitting a free rotation of said palm roller on said cylindrical peg.

5. Spool-rod for a display device comprising, in combination rod means;

first handle means disposed at one end of said rod means;

second handle means disposed at the opposite end of said rod means; said rod means and of one of said first and second handle means being provided with attaching means for detachably connecting said rod means and one of said first and second handle means;

an extension rod;

each of said first and second handle means being provided with a longitudinal hole open toward outside ends of said first and second handle means and having a cross section commensurate for a close-running fit with a cross section of said extension rod, both cross sections having each at least two contact surfaces; and base roller means loosely attached for rotation around an outside end of said extension rod, whereby said spool-rod can be rotated.

6. Display device adaptable to use a cartridge of continuous flexible material terminating at each end in a tubular element, which display device comprises a pair of spool-rod means, each of which including rod means;

first handle means disposed at one end of said rod means;

second handle means disposed at the opposite end of said rod means; said rod means and one of above mentioned handle means being provided with attaching means for detachably connecting said rod means and one of above mentioned handle means;

cylindrical dowel extending inwardly from each of the above mentioned handle means;

rolling collar loosely mounted, for easy rotation, on each of said cylindrical dowels, each rolling collar being provided with equally spaced and radially drilled blind holes; and at least one separator having one end inserted into a blind hole of one of said rolling collars, while the opposite end is inserted into another blind hole of a transversally opposite rolling collar; whereby at least one said separator is adapted to keep said pair of spool-rods apart.

7. Display device adaptable to use a cartridge of continuous flexible material terminating at each end in a tubular element, which display device comprises a pair of spool-rod means, each of which including rod means;

first handle means disposed at one end of said rod means;

second handle means disposed at the opposite end of said rod means; said rod means and one of the above mentioned handle means being provided with attaching means for detachably connecting said rod means and one of above mentioned handle means;

a cylindrical dowel extending inwardly from each of the above mentioned handle means;

a rolling collar loosely mounted, for easy rotation, on each of said cylindrical dowels, each rolling collar being provided with equally spaced and radially drilled blind holes;

frame means having a pair of long sides, in each of said long sides a pair of blind openings being provided, and each of said pair openings is the mirror image of the opposite one, said blind holes being compatible with said blind openings;

two pairs of vertical bars used to support said pair of spool-rods on said frame means, each of said vertical bars having its upper end inserted into a blind hole, while its lower end is inserted into an opposite blind opening.

8. Display device, as defined in claim 7, further comprising a crank provided with a shaft insertable in the outside end of each of said first and second handle means.

9. Display device adaptable to use a cartridge of continuous flexible material terminating at each end in a tubular element, which display device comprises a pair of spool-rod means, each of which including rod means;

first handle means disposed at one end of said rod means;

second handle means disposed at the other end of said rod means; said rod means and one of the above mentioned handle means being provided with attaching means for detachably connecting said rod means and one of above mentioned handle means, each of the latter being provided with a longitudinal hole having a transversal notch proximate to its external end; and carrier means comprising a handgrip having at both extremities downwardly extending split sections, each of said split sections including two arms, one of said two arms having at its end a rounded tooth extending outwardly; whereby when said split sections are inserted into or withdrawn from said longitudinal holes said teeth snap into or out of said transversal notches.

* * * * *